United States Patent [19]

Carroll, Jr.

[11] Patent Number: 4,648,194
[45] Date of Patent: Mar. 10, 1987

[54] LONG DISTANCE FISHING SYSTEM

[76] Inventor: Robert Carroll, Jr., 663-¼ E. Vernon Ave., Los Angeles, Calif. 90010

[21] Appl. No.: 290,889

[22] Filed: Aug. 7, 1981

[51] Int. Cl.⁴ ............................................. A01K 91/02
[52] U.S. Cl. ............................................ 43/4.5; 43/19
[58] Field of Search ............... 43/4, 4.5, 19, 19.2, 43/43.1, 43.11, 43.13, 43.12

[56] References Cited

U.S. PATENT DOCUMENTS

| | | | |
|---|---|---|---|
| 2,677,208 | 5/1954 | Newton | 43/43.11 |
| 2,744,352 | 5/1956 | Holgerson | 43/43.13 |
| 2,766,548 | 10/1956 | Willardsen | 43/43.13 |
| 2,958,976 | 11/1960 | Adams | 43/43.12 |
| 3,149,435 | 9/1964 | Nordeen | 43/43.11 |
| 3,358,399 | 12/1967 | Waldmann | 43/4 |
| 3,462,870 | 8/1969 | Terilli | 43/43.12 X |

FOREIGN PATENT DOCUMENTS 1262033  4/1961  France .................................. 43/4.5

OTHER PUBLICATIONS

*The Washington Daily News,* "Belvedere" Jan. 30, 1963, p. 61.
*The Star Magazine,* "Fishing with a Kite" Apr. 1, 1962.
*Field & Stream,* J. Samson, "New Way for Surf Stripers", vol. LXXIV, No. 2, Jun. 1969, pp. 22, 24, 30, 42.

*Primary Examiner*—Nicholas P. Godici
*Attorney, Agent, or Firm*—Thomas I. Rozsa

[57] ABSTRACT

An improved apparatus and method for fishing at a location in water relatively remote from where the fisherman is positioned on land, under conditions where there is a wind blowing in a direction from the fisherman toward the location where he wants the hook and bait to be located in the water, the improved apparatus and method to be used with a conventional fishing rod, reel, fishing line, fishing jig, hook and bait.

5 Claims, 3 Drawing Figures

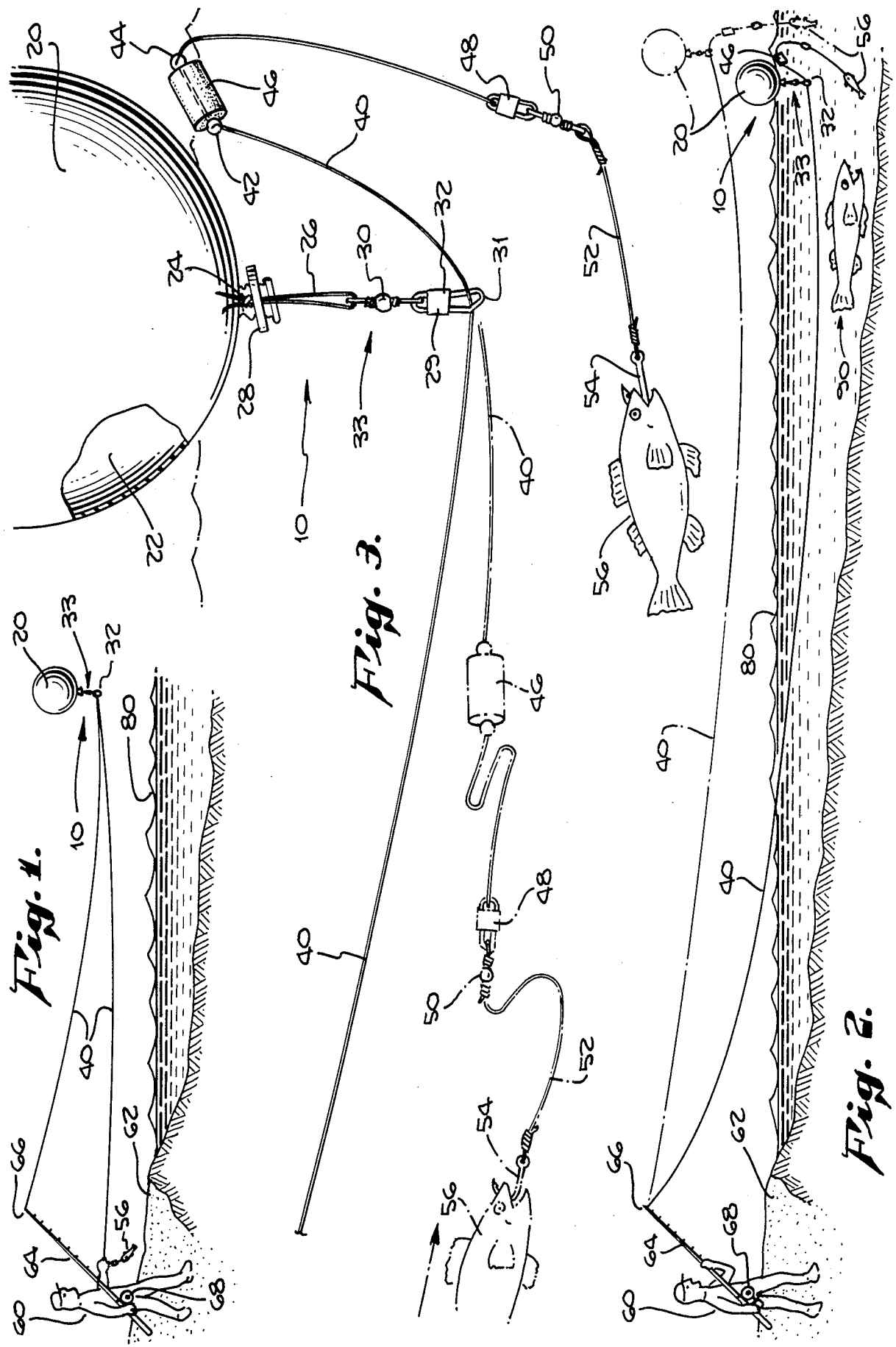

LONG DISTANCE FISHING SYSTEM

BACKGROUND OF THE INVENTION

This invention relates to an improved fishing apparatus which enables a fisherman to stand on a beach or on a pier and fish several hundred yards out to sea, or to stand on the shore of a lake and fish at its deepest part in the center of the lake.

The basic apparatus is a conventional fishing rod and reel. In conventional fishing systems, an individual fishing off the shore of a lake or standing on a beach or a pier adjacent an ocean casts his line into the water by conventional fishing casting methods. Even the most able fisherman seldom gets his line and bait much further than seventy-five to one hundred feet from the shore. In lake fishing, this is usually satisfactory to catch small trout, sunfish, etc. In ocean fishing, only modest success can be achieved at this distance. In addition, the ocean current continuously draws the line in, necessitating frequent recasting.

In order to successfully fish in deeper waters, a boat is employed. On a lake, fishing from a boat enables the fisherman to cast his line and bait into the deeper parts of the lake where more and bigger fish are likely to be present. Although this method can be successful, the presence of the boat often alerts the fish and they are less likely to attack the bait. In order to fish in deeper waters in the ocean, a boat is also employed. Once again, the presence of the boat serves to alert the fish to the presence of the fisherman. In addition, chartering a boat can add to the expense of the fishing venture and the time it takes to actually start fishing. Even if a person owns a boat, there is considerable effort involved in hauling the boat to the fishing site, unloading it, preparing it for fishing, and either rowing it out to the center of a lake or motoring it out to the ocean.

The present invention serves to eliminate all of these problems by incorporating an apparatus which enables the fisherman to have the ability to fish as far offshore as though he were in a boat, while still standing on the shore, beach, pier, or comparable area adjacent the water. The general concept of such an apparatus has been though of before but the previous applications have been commercial failures because they have been impractical. U.S. Pat. No. 3,462,870 issued to Terilli discloses an aerial fishing system in which a kite attached to the fishing line carries the line far out to sea. A very similar concept utilizing a kite to carry the line and bait out to sea while the fisherman is standing on a pier was disclosed in U.S. Pat. No. 3,358,399 issued to Waldmann. The use of a kite for this purpose is totally impractical. First, there must be a substantial amount of wind in order to enable the kite to fly and carry the fishing line out to sea or to the center of a lake. Second, the wind must be continuous and blow in the same direction in order to sustain the kite in flight. A sudden shift of wind can cause the kite to fly off in another direction, carrying the hook and bait with it. Third, once the wind dies down, the kite will fall into the water. The kite will sink into the water and the bulk of the kite will make it much harder to pull the line in. Usually, the kite will drop much too fast to enable the line to be pulled in before the kite hits and sinks into the water. In addition to the drag problem, there is an excellent chance of the kite being damaged and possibly destroyed if the ocean current is rough. Therefore, the use of a kite is impractical.

The ues of an air inflated, resilient envelope or bag to act as a float is disclosed in U.S. Pat. No. 2,677,208 issued to Newton. In this patent, the invention is to provide a fishing float of sufficient size to be seen for relatively long distances, yet which is sufficiently light in weight to permit comparatively great distances to be covered by the float. In this disclosure, the inflatable envelope or bag is used as a float and is not equipped to carry the line and bait out to sea.

U.S. Pat. No. 3,149,435 issued to Nordeen also discloses a fishing float in which the float is a balloon. The purpose of the balloon is merely to act as a float. The method of carrying the line and bait out to sea is by a complex propellor apparatus which carries the balloon out to sea. In a second embodiment, the propellor is eliminated and actuating mechanism is substituted. In either embodiment, the complexity of the device renders it likely to have numerous problems while in use. Finally, U.S. Pat. No. Re. 28,331 issued to Nordeen discloses a complex fishing apparatus in which the float is a balloon and is used to lift the caught fish vertically out of the water.

Therefore, although the general concept of using a flying object (i.e., a kite) to carry a fishing line out to sea and the general concept of using a balloon to act as a float has been taught in the prior art, no really simple practical apparatus has been developed for carrying a line out to sea or to the middle of a lake in the absence of a strong continuous wind and enabling the line to be towed back easily after the fish has been caught.

SUMMARY OF THE PRESENT INVENTION

It has been discovered, according to the present invention, that the use of a specially attached balloon to a fishing line can carry the fishing line and bait far out to sea or toward the center of a lake while enabling the fisherman to stand on a shore, beach, pier, or comparable area adjacent water and use a conventional fishing rod and reel.

It has further been discovered, according to the present invention, that if the balloon is filled with helium, the balloon can carry the line out to sea or the center of a lake even if there is an absolute minimum of wind velocity. Further, once the balloon has traveled the desired distance, a continuous wind is no longer required as the balloon will float in the air even if there is no wind.

It has additionally been discovered, according to the present invention, that if a balloon filled with helium is used to carry a fishing line and bait out to sea, the helium filled balloon will float in the air and will not come in contact with the water's surface, thereby reducing the possibility that a shoreward current will carry the balloon back to the shore.

It has further been discovered, according to the present invention, that the use of a helium filled balloon to carry a fishing line and bait out to sea or the center of a lake provides a very simple, inexpensive attachment to a conventional fishing rod and reel which will enable the fisherman to go deep sea or deep lake fishing while standing on the beach or pier or on the shore, and not require the use of a fishing boat.

It has also been discovered, according to the present invention, that the use of a helium filled balloon will cause the line to bob up and down in the water, thereby causing the bait to move in the water and increase the chances of the fish biting at the bait.

It has additionally been discovered, according to the present invention, that the use of a helium filled balloon attached to the fishing line in a movable fashion will enable the fisherman to adjust the distance at which the bait is in the water and readjust that distance as often as he desires.

It has further been discovered, according to the present invention, that the use of a helium filled balloon movably attached to a fishing line will provide a clear signal as soon as the fish has bitten, thereby giving the fisherman time to pull back on the line and secure the hook in the fish's mouth before the fish gets away.

It is therefore an object of the present invention to provide a very simple, inexpensive means to enable a fisherman to stand on a shore, beach, pier, or comparable area adjacent a body of water while having the fishing line and bait carried far out into the water where the fishing is likely to be much better than just offshore.

It is a further object of the present invention to provide a balloon filled with helium and movably attached to a fishing line at a location between the end of the fishing rod and the hook and bait so that the helium filled balloon can carry the fishing line and bait far out to sea or toward the center of a lake with an absolute minimum of wind.

It is an additional object of the present invention to provide a means which will carry a fishing line and bait far out to sea and further enable the fisherman to adjust the distance both further in and further out at whch the hook and bait are in the water without necessitating re-casting of the fishing line.

It is another object of the present invention to provide a means by which the bait is caused to move after the line and bait have been positioned far away from the fisherman.

It is a further object of the present invention to provide a means which will keep the line, hook and bait far out to sea in spite of a shoreward current which would tend to pull the bait in to the shore.

It is an additional object of the present invention to provide a helium filled balloon movably attached to a fishing line to act as a signal as soon as the fish has bitten, and enable the fisherman to secure the fish before it gets away.

It is another object of the present invention to provide a means for deep sea or deep lake fishing while eliminating the use of a boat, thereby reducing the cost of fishing and removing the boat which could alert the fish to the presence of a fisherman.

Further novel features and other objects of the present invention will become apparent from the following detailed description, discussion and appended claims, taken in conjunction with the drawings.

DRAWING SUMMARY

Referring particularly to the drawings for the purpose of illustration only and not limitation there is illustrated:

FIG. 1 is a pictorial view of the present invention in use with a conventional fishing rod, reel and line.

FIG. 2 is a side elevational view of the present invention in use, with a phantom view of the bait and cork being taken out to sea by the present invention.

FIG. 3 is a pictorial view of the present invention in operation, with an additional phantom view of the present invention before its final positioning.

DETAILED DESCRIPTION OF THE PREFERRED EMBODIMENT

With reference to the drawings of the invention in detail and more particularly to FIG. 1, there is shown at 10 the present invention in use with a conventional fishing rod, reel and line. The details of the present invention are shown more clearly in FIG. 2. The present invention 10 consists of a balloon 20 which is filled with a lighter than air gas 22. In general, an ordinary rubber circus balloon can be used, although balloons of heavier material can also be employed. The lighter than air gas is preferably helium. Helium is not flammable and can therefore be easily transported and safely used. The balloon 20 is inflated with helium 22 and then tied at point 24 by a slip knot fashioned from a piece of fishing line 26. A perforated disc 28 secured through the tied end of the balloon 20 serves to secure the fishing line piece 26 with the slip knot to the balloon 20 and also assures that air will not escape through the mouth of the balloon.

The piece of fishing line 26 which is used to tie the balloon 20 also extends through one end of a conventional fishing swivel 30. The other end of the fishing swivel 30 is attached to a conventional fishing snap 32. In lieu of the piece of fishing line 26, a piece of string, wire, thread, or other comparable means can be used to tie the balloon 20 and movably secure it to the fishing swivel 30. The piece of fishing line 26, fishing swivel 30, and fishing snap 32 provide the movable securing means 33 by which the helium filled balloon 20 is movably secured to the fishing line 40.

The end portion of the fishing line 40 is shown in FIG. 2. Any number of conventional fishing jigs can be employed with the present invention. In FIG. 2, a cork 46 is surrounded by first sinker 42 and second sinker 44 respectively. At the end of the fishing line 40 is attached a conventional fishing snap 48 and fishing swivel 50 which in turn is attached to a lead line 52 that is secured to the hook 54. In the present illustration in FIGS. 2 and 3, the bait which is being used is a small bait fish 56. Numerous other types of bait including but not limited to a lure, a worm, fish eggs, etc. may also be used.

In practice, the present invention which consists of the helium filled balloon 20 and the movable securing means 33 is movably attached to the fishing line 40 as shown in FIG. 2. In the present illustration, the fishing line 40 is run through the snap 32. In a conventional snap 32, one side of the snap 31 can be opened from its base 29 and the fishing line 40 is thereby inserted through the snap 32 before the opened side 31 is once again secured to the base 29 of the snap 32.

The present invention is shown in use in FIG. 1. The fisherman 60 is shown standing on a beach 62. A conventional fishing rod 64 and reel 68 is used. The fisherman 60 allows a small amount of line 40 to extend from the top end 66 of the fishing rod 64. The present invention 10 is then movably placed on the fishing line 40 as discussed above and illustrated in FIG. 2 so that the present invention 10 lies between the top end 66 of the fishing rod 64 and the first sinker 42. The fisherman then holds the end of the fishing line 40 containing the fishing jig, hook 54 and bait 56 in one hand and sets the reel 68 so that the fishing line 40 is free to move.

The helium filled balloon 20 then begins to float upward since it is lighter than air and will float out over the water 80 as a slight wind begins to push it. The helium filled balloon 20 will move along the fishing line 40 and will pull more and more fishing line 40 out over the water 80. Since the fisherman 60 is holding the end of the line 40 with the hook 54 and bait 56, the outward travel of the helium filled balloon 20 and fishing line 40 is stabilized. The fisherman 60 allows the balloon 20 to travel in this fashion until it has traveled a distance of approximately one half the total desired distance. At this point, the reel 68 is locked so that no more fishing line 40 can travel out over the water 80. This is the precise view shown in FIG. 1, with the balloon 20 over the water 80 while the fisherman 60 is still holding on to the end of the line 40 with the hook 54 and bait 56 attached. Alternatively, the fisherman 60 could hold on to the end of the line 40 without the bait 56 attached and then attach the bait 56 after the balloon 20 has traveled to the position shown in FIG. 1.

At this point, the fisherman releases the end of the line 40 with the hook 54 and bait 56 attached and this end of the fishing line 40 begins to be pulled out over the water 80 as the movable securing means 33 travels along the fishing line 40 toward the cork 46 and first and second sinkers 42 and 44 respectively. The phantom view of FIG. 2 shows the bait fish 56, hook 54 and other portions of the jig being pulled out over the water 80. The side elevational view of FIG. 2 shows the present invention 10 reaching its final destination point adjacent the first sinker 42.

The phantom pictorial view of FIG. 3 shows the present invention 10 almost at its maximum distance and the pictorial view of FIG. 3 shows the bait fish 56 in the water 80, the cork 46 floating on top of the water 80 and the balloon 20 floating in the air above the water 80. The ballon 20 in FIG. 3 is approximately at twice the distance that the balloon 20 was in FIG. 1.

By means of the present invention 10, the fisherman 60 has remained on the beach 62 while the bait 56 has been taken far out to sea. Alternatively, the fisherman 60 could have been standing on a pier, on a shore of a lake, or on a comparable area of land adjacent a body of water. For example, the line 40 and bait 56 can be four hundred yards out to sea in the pictorial view of FIG. 3. It would be totally impossible for the fisherman 60 to cast the line 40 out to this distance by any conventional casting methods. The only other way to practically get the line 40 and bait 56 this far out to sea or to the center of a lake would be to use a boat. This would add to the effort and time in preparing for fishing and preparing the boat, and would add to the expense of the trip. Additionally, a boat could alert the fish to the presence of a fisherman 60. With the present invention 10, the bait 56 is far out to sea or in the middle of a lake with no fisherman or boat present. As a result, a fine game fish 90 is more likely to attack the bait 56 and be captured.

As shown in the pictorial view of FIG. 3, the helium filled balloon 20 floats in the air above the water 80. This will be true even if there is no wind because the balloon 20 is filled with helium 22 and is lighter than air. Disclosures in the prior art using a kite to transport the fishing line out to sea are impractical, because as soon as the wind dies down the kite will fall into the water. With the fishing line several hundred yards out to sea, the fishing line couldn't be pulled in before the kite falls into the water. As a result, the bulk of the kite provides considerable drag in preventing the line from being brought in and the kite will probably be seriously damaged during the process. The use of a helium filled balloon floating above the water completely eliminates this problem.

Disclosures in the prior art also show an inflatable bag or envolope which floats on the surface of the water, and acts as a float. The problem with that construction is that a shoreward current will pull the float and the bait in toward the shore, necessitating frequent recasting of the fishing line. The present invention eliminates this problem since the balloon 20 floats in the air and does not rest on the water's surface. As a result, the floating balloon 20 will counteract the shoreward current and will keep the jig, hook and bait out to sea, thereby elimninating the requirement for frequent recasting.

Disclosures in the prior art show a complex system which is designed to propel a balloon out over a body of water, or a complex inflatable system designed to pull the fish out of the water after it is caught. The complexity of these systems virtually guarantees that there will be performance problems in actual use, especially in ocean fishing when there are rough seas. The ingeniousness of the present invention is in its simplicity. It is totally effective for performing the required task of transporting the line out to sea while at the same time being of simple construction and thereby removing the possibility of performance problems during use.

The present invention also allows the distance that the hook 54 and line 56 are out into the water to be frequently adjusted. Referring once again to the pictorial view of FIG. 3, if the fisherman 60 desires to have the hook 54 and bait 56 further out in the water 80, he merely releases the lock on the reel 68 which frees the fishing line 40. The balloon 20 will then carry the fishing line 40 further out to sea or the lake. After it has reached the desired distance, the reel 68 is once again locked. Should the fisherman desire to have the fishing line 40, hook 54 and bait 56 moved closer to the beach, pier or shore, he merely reels the line in until it is at the desired distance. The present invention affords the fisherman 60 total flexibility in bringing the line and bait in closer or transporting it further away on numerous occassions without the necessity of re-casting.

An additional advantage of the present invention is its ability to assist in getting the game fish 90 to attack the bait 56 and alert the fisherman 60 who is far away to this fact before the game fish 90 can get away. By floating in the air, the helium filled balloon 20 causes the bait 56 to move up and down in the water, and thereby attract the game fish 90. Second, after the game fish 90 has taken the bait 56, the balloon 20 will be drawn toward the water, thereby signalling the fisherman 60 that the game fish 90 has taken the bait 56. This will enable the fisherman 60 to pull back on the line 40, securing the hook 54 in the mouth of the game fish 90 before the fish can get away.

Another advantage of the present invention is demonstrated when an adverse wind begins to blow. A kite would be totally out of control and could cause the line to snap, or a least create a lot of problems for the fisherman 60 as he attempts to pull the line 40 in. With the present invention 10, the helium filled balloon 20 can easily be pulled in with a minimum of resistance, since the spherical shape affords little resistance to the wind.

An additional advantage of the present invention is that it trolls the bait fish 90 through the water 80 while the balloon 20 is transporting the line, fishing jig, hook and bait out to the desired distance. The balloon 20 filled with a lighter than air gas 22 (such as helium) has sufficient strength to carry the fishing line and fishing jig over the body of water when propelled by a wind while at the same time permitting the bait fish 56 to remain in the water 80. As a result, the bait fish 56 is trolled through the water 80 while the balloon 20 is transporting the fishing line 40 out to the desired distance, and this increases the chances of a game fish 90 attacking the bait fish 56.

The fishing jig used in the present disclosure consists of the cork 46 attached to the fishing line 40, the first sinker 42 attached to the fishing line 40 and on one side of and adjacent to the cork 46 and a second sinker 44 attached to the fishing line 40 and on the opposite side of and adjacent to the cork 46. The fishing jig also contains a fishing snap 48 attached to the end of the fishing line 40 remote from the reel 68, a fishing swivel 50 attached to the fishing snap 48 and a lead line 52 attached to the fishing swivel 50 at one end and to the hook 54 at its other end. This, however, is not the only fishing jig arrangement which can work with the present invention. This jig arrangement affords the flexibility of varying the depth at which the hook 54 and bait 56 are in the water 80 by moving the location of the first and second sinkers 42 and 44 respectively and the cork 46 along the fishing line 40. Numerous other forms of fishing jigs are also usable with the present invention 10.

Another advantage of the present invention 10 is that the balloon 20 acts like a float after the fish 90 has been caught and aids in preventing the game fish 90 from pulling the line very deeply under the water 80 and possibly going under a rock.

The overall concept of the present invention is both an apparatus and a method for fishing at a location in water relatively remote from where the fisherman is positioned on land, under conditions where there is a wind blowing in a direction from the fisherman toward the location where he wants the hook and bait to be located in the water. As discussed earlier, a standard circus balloon can be used. For use with a thirty pound fishing line, the balloon should be filled with approximately one cubic foot of helium. For heavier lines, larger balloons with a comparably larger volume of helium can be used. Also, a multiplicity of balloons can be used to provide greater lifting power. Other lighter than air gases can be used, but helium is preferred since it isn't flamable and is easy to transport.

The movable securing means 33 disclosed in the above specification is only one form of several such attachments which can be used. The common fact is to provide an attachment means which can be easily placed around the line 40 and is capable of longitudinal slidable movement along the fishing line 40 to transport it over the water 80. Therefore, any movable securing means 33 which ties the helium filled balloon 20 and can movably slide along the fishing line 40 is within the scope of the present invention. Through use of this simple method of movable attachment, the present invention can perform its intended function while at the same time assuring that mechanical problems will not develop even during use under the most adverse conditions because of the simplicity of the device. The distance between the mouth of the balloon 20 and the fishing line 40 is not critical and by way of example only can be approximately six inches.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An improved apparatus for fishing at a location in water remote from where the fisherman is positioned on land, under conditions where there is a wind blowing in a direction from the fisherman toward the location where he wants the hook and bait to be located in the water, the improved apparatus to be used with a fishing rod, reel, fishing line, fishing jig, hook and bait, wherein the improved apparatus comprises:
    a. a balloon filled with a lighter than air gas;
    b. a movable securing means tying said balloon and movably attached to the fishing line at a location between the upper end of the fishing rod and the fishing jig;
    c. said movable securing means being capable of longitudinal slidable movement along the fishing line;
    d. said balloon filled with a lighter than air gas having sufficient strength to carry said fishing line and said fishing jig over a body of water when said balloon is propelled by a wind while at the same time permitting the bait to remain in the water;
    e. a slight wind being sufficient to propel said balloon and movable securing means and enabling said movable securing means to move along said fishing line and to transport said fishing line, jig, hook and bait out over a body of water to a location remote from where the fisherman is positioned on land after the reel is unlocked and the fishing line is able to move freely;
    f. said balloon filled with a lighter than air gas being able to float in the air and maintain said hook and bait at the desired location in the water after the reel is locked and the fishing line is no longer able to move freely;
    g. said balloon filled with a lighter than air gas being able to float in the air and maintain said hook and bait at the desired location in the water after the propelling wind has ceased;
    h. said balloon filled with a lighter than air gas being capable of movement wherein the balloon can carry the line, jig, hook and bait to a more remote location after the reel is unlocked and a wind propels the balloon to a further distance and wherein the balloon can float inward to a location closer to the fisherman when the fishing line is reeled in;
    i. said balloon filled with a lighter than air gas and said movable securing means providing a signal to indicate when a fish has taken the bait; and
    j. said balloon filled with a lighter than air gas so as to enable the caught fish to be easily retrieved by reeling in said fishing line.

2. The invention as defined in claim 1 wherein said lighter than air gas is helium.

3. The invention as defined in claim 1 wherein said movable securing means is comprised of:
    a. a piece of fishing line tied to the mouth of the balloon;

b. a fishing swivel through which the piece of fishing line passes; and c. a fishing snap movably attached to the fishing swivel at one end and movably attached to the fishing line from the fishing rod at its other end.

4. An improved method for fishing at a location in water remote from where the fisherman is positioned on land, under conditions where there is a wind blowing in a direction from the fisherman toward the location where he wants the hook and bait to be located in the water, the improved method to be used with a fishing rod, reel, fishing line, fishing jig, hook and bit, wherein the improved method comprises:

a. filling a balloon with a lighter than air gas;

b. tying said balloon with a movable securing means and attaching the movable securing means to the fishing line at a location between the upper end of the fishing rod and the fishing jig so that the movable securing means can slide longitudinally along the fishing line;

c. holding the fishing rod and reel in one hand and the end of the fishing line containing the fishing jig, hook and bait in the other hand;

d. unlocking the reel so that the fishing line is free to move;

e. allowing said balloon filled with a lighter than air gas to be propelled by a wind blowing in the desired direction so that the propelled balloon floats out over the water and carries the movable fishing line with it;

f. allowing said balloon to travel a distance which is approximately one half the desired location for the hook and bait in the water;

g. locking the reel so that no further fishing line can travel from the reel; and h. releasing the end of the line containing the fishing jig, hook and bait so that said propelled balloon and said movable securing means continues along the longitudinal distance of the fishing line as the balloon is propelled further out over the water, thereby transporting additional fishing line and the fishing jig over the water and a portion of the fishing jig, hook and bait through the water, until the balloon has reached its maximum distance and floats just above the water while the hook and bait are submerged in the water at the desired location;

i. whereby the fisherman has stood on the land while the balloon filled with a lighter than air gas and the movable securing means have transported the fishing jig, hook and bait to a location in the water remote from where the fisherman is standing and the balloon can continue to maintain its position even after the propelling wind has ceased.

5. The invention as defined in claim 4 wherein the lighter than air gas is helium.

* * * * *